(12) United States Patent
Villanueva et al.

(10) Patent No.: US 11,091,086 B2
(45) Date of Patent: Aug. 17, 2021

(54) STRAPPING DEVICE

(71) Applicant: Allstar Seed Company, El Centro, CA (US)

(72) Inventors: Oscar Villanueva, Calexico, CA (US); Daniel Maciel, Calexico, CA (US); Ismael Villalobos, Calexico, CA (US)

(73) Assignee: ALLSTAR SEED COMPANY, El Centro, CA (US)

( * ) Notice: Subject to any disclaimer, the term of this patent is extended or adjusted under 35 U.S.C. 154(b) by 209 days.

(21) Appl. No.: 16/389,411

(22) Filed: Apr. 19, 2019

(65) Prior Publication Data

US 2020/0331383 A1 Oct. 22, 2020

(51) Int. Cl.
*B60P 7/00* (2006.01)
*B60P 7/08* (2006.01)

(52) U.S. Cl.
CPC .......... *B60P 7/0853* (2013.01); *B60P 7/0846* (2013.01)

(58) Field of Classification Search
CPC ......... B60P 7/0853; B60P 7/0846; B25J 1/04; B65B 13/025
USPC ........................... 410/97–100, 156
See application file for complete search history.

(56) References Cited

U.S. PATENT DOCUMENTS

| 983,795 | A | * | 2/1911 | Youngren | |
|---|---|---|---|---|---|
| 3,357,654 | A | * | 12/1967 | Losman et al. | B65H 75/406 242/405.3 |
| 5,454,611 | A | | 10/1995 | Wanat | |
| 5,791,844 | A | * | 8/1998 | Anderson | B60P 7/083 410/100 |
| 6,749,382 | B2 | * | 6/2004 | Lambie | B65B 13/025 410/97 |
| 6,820,906 | B1 | | 11/2004 | McClendon | |
| 7,393,031 | B2 | | 7/2008 | Goulet | |
| D739,694 | S | | 9/2015 | Epting | |
| 9,428,096 | B1 | | 8/2016 | Bach | |
| 10,081,097 | B1 | | 9/2018 | Abbey | |
| 10,406,965 | B1 | | 9/2019 | Johnson | |
| D863,041 | S | | 10/2019 | Short | |
| 2008/0314372 | A1 | | 12/2008 | Guindon | |
| 2010/0028100 | A1 | * | 2/2010 | Lampman | B61D 45/00 410/156 |

* cited by examiner

*Primary Examiner* — Stephen T Gordon
(74) *Attorney, Agent, or Firm* — The Sladkus Law Group

(57) ABSTRACT

A strapping device to secure an item, the strapping device comprising an elongate rod extending along a longitudinal rod axis, the rod having a proximal end, an opposed distal end and a central portion extending between the proximal end and the distal end, a handle coupled to the proximal end of the elongate rod, a strap arm coupled to the distal end of the elongate rod, a wound strap positioned around at least a portion of the strap arm, and at least one retainer positioned on the strap arm at a desired position relative to the elongate rod and configured to guide the strap.

13 Claims, 4 Drawing Sheets

STRAPPING DEVICE

TECHNICAL FIELD

Field of Use

This disclosure relates to strapping devices. More specifically, this disclosure relates to strapping devices that permit a strap to be placed over an item while a user of the device remains safely on the ground.

RELATED ART

A strap is used to secure an item, such as a bale, carton and the like, to a platform, such as a trailer, a truck bed and the like. Conventionally, to place the strap over the item, a user has to throw the free end of the strap over the item. If the item is high, and/or the strap is heavy, it can be difficult or impossible to throw the free end over the item. In this case, the user has to climb onto the item in order to place the strap over the item. This can be dangerous as the user can fall off the item, and/or the item can fall off the platform.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a strapping device to secure an item, the strapping device comprising an elongate rod extending along a longitudinal rod axis, the rod having a proximal end, an opposed distal end and a central portion extending between the proximal end and the distal end, a handle coupled to the proximal end of the elongate rod, a strap arm coupled to the distal end of the elongate rod, a wound strap positioned around at least a portion of the strap arm, and at least one retainer positioned on the strap arm at a desired position relative to the elongate rod and configured to guide the strap.

In another aspect, also disclosed is a method of strapping an item to be secured to a platform, the method comprising providing a strapping device comprising an elongate rod extending along a longitudinal rod axis, the rod having a proximal end, an opposed distal end and a central portion extending between the proximal end and the distal end, a handle coupled to the proximal end of the elongate rod, a strap arm comprising a first end coupled to the distal end of the elongate rod and a second end extending away from the elongate rod a predetermined strap arm length, and at least one retainer positioned on the strap arm at a desired position relative to the elongate rod and configured to guide the strap, winding a strap around at least a portion of the strap arm such that a first end of the strap is positioned adjacent the strap arm and a free end of the strap extends away from the strap arm, attaching the free end of the strap to the platform, and lifting the remaining portion of the strap over and around the item to be secured with the elongate rod such that the strap unwinds off of the strap arm and onto the item, wherein the predetermined strap arm length is configured to position the strap over the item at a distance spaced from an edge of the item.

In another aspect, also disclosed is a strapping device to position a strap around an item to be secured, the strapping device comprising an elongate rod extending along a longitudinal rod axis, the rod having a proximal end, an opposed distal end and a central portion extending between the proximal end and the distal end, a handle coupled to the proximal end of the elongate rod, a strap arm coupled to the distal end of the elongate rod, and at least one retainer positioned on the strap arm at a desired position relative to the elongate rod and configured to guide the strap, wherein the strap is wound around itself and wherein the wound strap is positioned on at least a portion of the strap arm.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
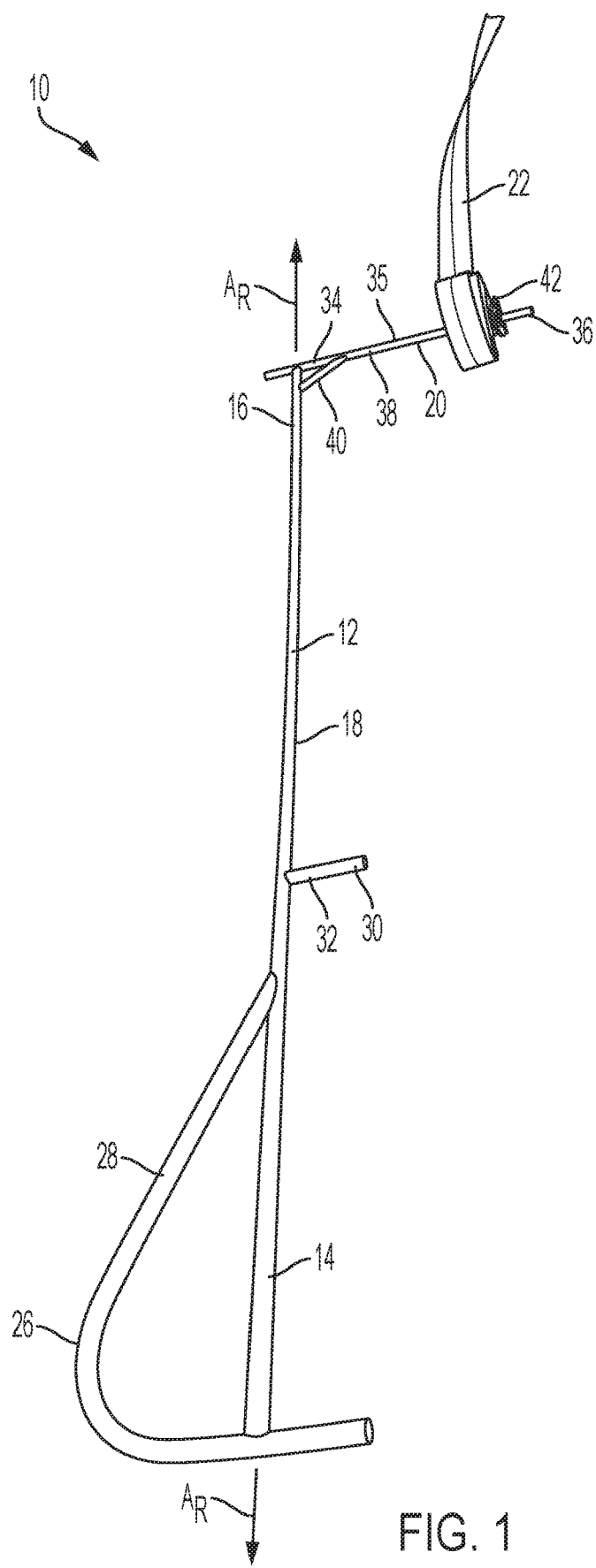
FIG. 1 is a perspective view of a strapping device comprising an elongate rod, a strap arm coupled to the elongate rod, and a strap positioned on the strap arm, in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. Also, the words "proximal" and "distal" are used to describe items or portions of items that are situated closer to and away from, respectively, a user or operator. Thus, for example, the tip or free end of a device may be referred to as the distal end, whereas the generally opposing end or far end may be referred to as the proximal end. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The word "platform" as used herein means any surface upon which an item can be positioned and secured, such as a truck bed, a trailer, a table and the like.

In one aspect, a strapping device and associated methods, systems, and various apparatuses are disclosed herein. It would be understood by one of skill in the art that the disclosed strapping device is described in but a few exemplary embodiments among many. No particular terminology or description should be considered limiting on the disclosure or the scope of any claims issuing therefrom.

FIG. 1 shows a perspective view of a strapping device 10 in accordance with one aspect of the present disclosure. The strapping device 10 can comprise an elongate rod 12 having a rod diameter, a proximal end 14, an opposed distal end 16 and a central portion 18 extending between the proximal end 14 and the distal end 16. In one aspect, the elongate rod 12 can extend along a longitudinal rod axis $A_R$. A strap arm 20 can be coupled to the distal end 16 of the rod 12 such that a strap 22, rope, and the like can be wound around or positioned on at least a portion of the strap arm 20. In use and with reference to FIG. 4, the elongate rod 12 can be used to position the strap 22 above and/or around an item 24 to be secured, such as a bale and the like.

The elongate rod 12 can have a rod length greater than the height of the item 24 to be secured. For example, if the item 24 to be secured is a bale having a height of ten feet, then the length of the elongate rod 12 can be greater than ten feet. Optionally, the elongate rod 12 can have a rod length such that the length of the rod 12 plus the length of the arms of a user are greater than the height of the item 24 to be secured.

Referring again to FIG. 1, the elongate rod 12 can comprise a handle 26 coupled to or formed integrally with the proximal end 14 of the elongate rod 12. In one aspect, at least a portion of the handle 26 can be formed from a handle rod 28 and can be positioned at an angle relative to the longitudinal rod axis $A_R$. For example, at least a portion of the handle 26 can be positioned at an acute angle relative to the longitudinal rod axis $A_R$. In another example, at least a portion of the handle 26 can be positioned substantially normal to the longitudinal rod axis $A_R$. In still another example, at least a portion of the handle 26 can be positioned at an acute angle relative to the longitudinal rod axis $A_R$, and at least a portion of the handle 26 can be positioned substantially normal to the longitudinal rod axis $A_R$. In another aspect, at least a portion of the handle 26 can be substantially linear in shape. Optionally, at least a portion of the handle 26 can be arcuate in shape. In still another aspect, the handle 26 can extend away from the elongate rod 12 a predetermined handle distance.

In some aspect, optionally, the elongate rod 12 can further comprise an intermediate handle 30 coupled to or formed integrally with the central portion 18 of the elongate rod 12. In one aspect, at least a portion of the intermediate handle 30 can be formed from an intermediate handle rod 32 and can be positioned at an angle relative to the longitudinal rod axis $A_R$. For example, at least a portion of the intermediate handle 30 can be positioned at an acute angle relative to the longitudinal rod axis $A_R$. In another example, at least a portion of the intermediate handle 30 can be positioned substantially normal to the longitudinal rod axis $A_R$. In still another example, at least a portion of the intermediate handle 30 can be positioned at an acute angle relative to the longitudinal rod axis $A_R$, and at least a portion of the intermediate handle 30 can be positioned substantially normal to the longitudinal rod axis $A_R$. In another aspect, at least a portion of the intermediate handle 30 can be substantially linear in shape. Optionally, at least a portion of the intermediate handle 30 can be arcuate in shape. In still another aspect, the intermediate handle 30 can extend away from the elongate rod 12 a predetermined intermediate handle distance. Optionally, the intermediate handle distance can be greater than, less than, or substantially equal to the handle distance.

The strap arm 20 can be coupled to or formed integrally with the elongate rod 12. In one aspect, the strap arm 20 comprises a first end 34 securely attached to or formed integrally with the distal end 16 of the elongate rod 12 and a second end 36 extending away from the elongate rod 12 so that the strap arm 20 extends away from the elongate rod 12 a predetermined strap arm length. Optionally, the strap arm length can be greater than, less than, or substantially equal to the handle distance and/or the intermediate handle distance. In another aspect, the strap arm 20 further comprises a central arm portion 38 that extends between the first end 34 and the second end 36 of the strap arm 20. In still another aspect, the strap arm 20 can have a strap arm diameter that is greater than, less than, or substantially equal to the rod diameter of the elongate rod 12.

In one aspect, at least a portion of the strap arm 20 can be formed from a strap arm rod 35 and can be positioned at an angle relative to the longitudinal rod axis $A_R$. For example, at least a portion of the strap arm 20 can be positioned at an acute angle relative to the longitudinal rod axis $A_R$. In another example, at least a portion of the strap arm 20 can be positioned substantially normal to the longitudinal rod axis $A_R$. In still another example, at least a portion of the strap arm 20 can be positioned at an acute angle relative to the longitudinal rod axis $A_R$, and at least a portion of the strap arm 20 can be positioned substantially normal to the longitudinal rod axis $A_R$. In another aspect, at least a portion of the strap arm 20 can be substantially linear in shape. Optionally, at least a portion of the strap arm 20 can be arcuate in shape.

In one aspect, the strapping device 10 can further comprise an arm brace 40 configured to maintain the strap arm 20 in the desired position relative to the elongate rod 12. For example, the arm brace 40 can be positioned between the strap arm 20 and the elongate rod 12 to eliminate or minimize movement of the strap arm 20 relative to the elongate rod 12.

Figure 2:
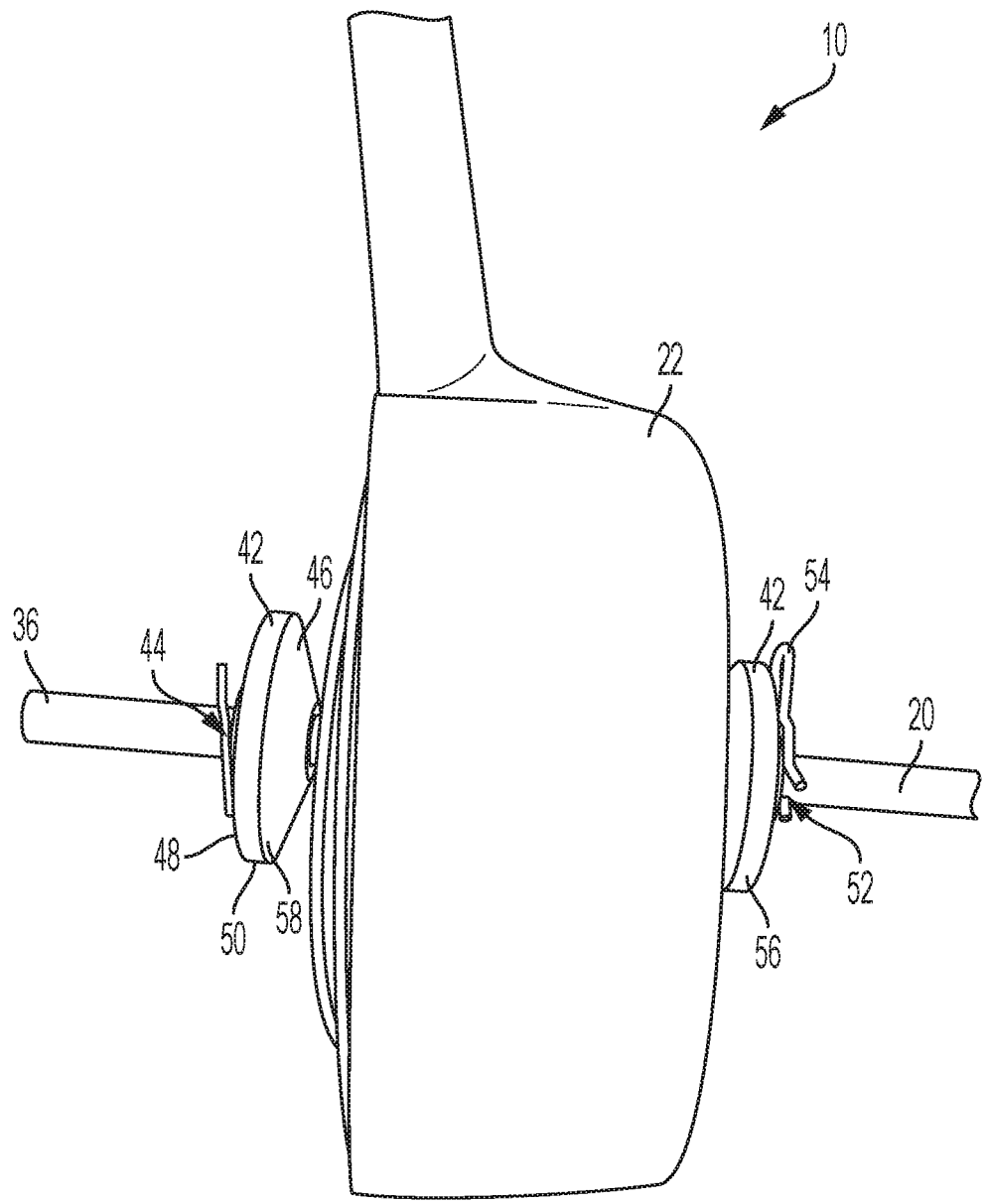
FIG. 2 is a perspective view of the strapping device of FIG. 1 showing the strap positioned on the strap arm.

With reference now to FIG. 2, the strapping device 10 can further comprise at least one retainer 42 positioned on the strap arm 20 at a desired position relative to the elongate rod 12. The retainer 42 can have a predetermined retainer diameter and can define a retainer bore 44 having a retainer bore diameter greater than the diameter of the strap arm 20. The retainer 42 can have a first face 46 configured to face the strap 22 when the device 10 is assembled, and a second face 48 opposed to the first face 46 and configured to face away from the strap 22 when the device 10 is assembled. In one aspect, at least a portion of the retainer 42 can be substantially frustoconical in shape. That is, the thickness of the retainer 42 can be greater adjacent to the retainer bore 44 than the thickness of the retainer 42 adjacent to an outer edge 50 of the retainer 42. In another aspect, the first face 46 of the retainer 42 can slope away from the retainer bore 44. For example, when assembled, the first face 46 of the retainer 42 adjacent to the retainer bore 44 can be a first distance away from the strap 22, and the first face 46 of the retainer 42 adjacent to the outer edge 50 can be a second distance away from the strap 22 that is greater than the first distance.

Pins, screws and the like can be used to maintain the at least one retainer 42 in the desired position longitudinally along the strap arm 20. For example, at least one aperture 52 can be defined through at least a portion of the strap arm 20. A pin 54, such as a cotter pin and the like, can be positioned in the aperture 52 to prevent the retainer 42 from moving longitudinally away from the strap 22 along the strap arm 20. In one aspect, the strap 22 and/or the frustoconical shape of the retainer 42 can prevent the retainer 42 from moving longitudinally towards the strap 22 along the strap arm 20.

In one aspect, the at least one retainer 42 can comprise a first retainer 56 and a second retainer 58. In this aspect, the first retainer 56 can be positioned on the strap arm 20 between the strap 22 and the elongate rod 12, and the second retainer 58 can be positioned on the strap arm 20 between the strap 22 and the second end 36 of the strap arm 20. In use, the first retainer 56 and the second retainer 58 can cooperate to keep the strap 22 in a desired position on the strap arm 20.

The strap 22 can be a conventional strap configured to securely attach an item to a platform, such as a trailer, truck bed, table and the like. For example, the strap 22 can be a conventional strap configured to securely attach a bale to a trailer. As used herein, however, the term "strap" can also refer to other devices used to securely attach an item to a platform, such as rope, cable, chain and the like.

The elongate rod 12, the handle 26, the intermediate handle 30, the strap arm 20, the arm brace 40, and the retainer 42 can be formed from rigid metallic materials such as aluminum, steel and the like. Alternatively, at least one of the elongate rod 12, the handle 26, the intermediate handle 30, the strap arm 20, the arm brace 40, and the retainer 42 can be formed from rigid polymeric materials such as nylon and the like.

To assemble the strapping device 10, the handle 26 can be securely attached to the proximal end 14 of the elongate rod 12, and the intermediate handle 30 can be securely attached to the central portion 18 of the elongate rod 12. The strap arm 20 can be securely attached to the distal end 16 of the elongate rod 12 and the arm brace 40 can be securely attached to the distal end 16 of the elongate rod 12 and to the strap arm 20. The first retainer 56 can be positioned on the strap arm 20 such that the first face 46 of the first retainer 56 faces away from the elongate rod 12, and a pin 54 can be inserted into the aperture 52 to maintain the first retainer 56 in the desired position. The second retainer 58 can be positioned on the strap arm 20 such that the first face 46 of the second retainer 58 faces the elongate rod 12, and a pin 54 can be inserted into the aperture 52 to maintain the second retainer 58 in the desired position. The strap 22 can then be wound around the strap arm 20 in the space between the first retainer 56 and the second retainer 58 such that a first end (not shown) of the strap 22 is positioned adjacent the strap arm 20 and a free end 62 of the strap 22 extends away from the strap arm 20.

Alternatively, the strap 22 can be wound up (around itself or around a spool) prior to positioning the second retainer 58 on the strap arm 20. The wound strap 22 can be positioned on the strap arm 20 by inserting the second end 36 of the strap arm 20 through a center 60 (FIG. 3) of the wound-up strap 22 or spool such that the first end (not shown) of the strap 22 is positioned adjacent the strap arm 20 and the free end 62 of the strap 22 extends away from the strap arm 20. The second retainer 58 can then be positioned on the strap arm 20 such that the first face 46 of the second retainer 58 faces the elongate rod 12, and a pin 54 can be inserted into the aperture 52 to maintain the second retainer 58 in the desired position.

Figure 3:
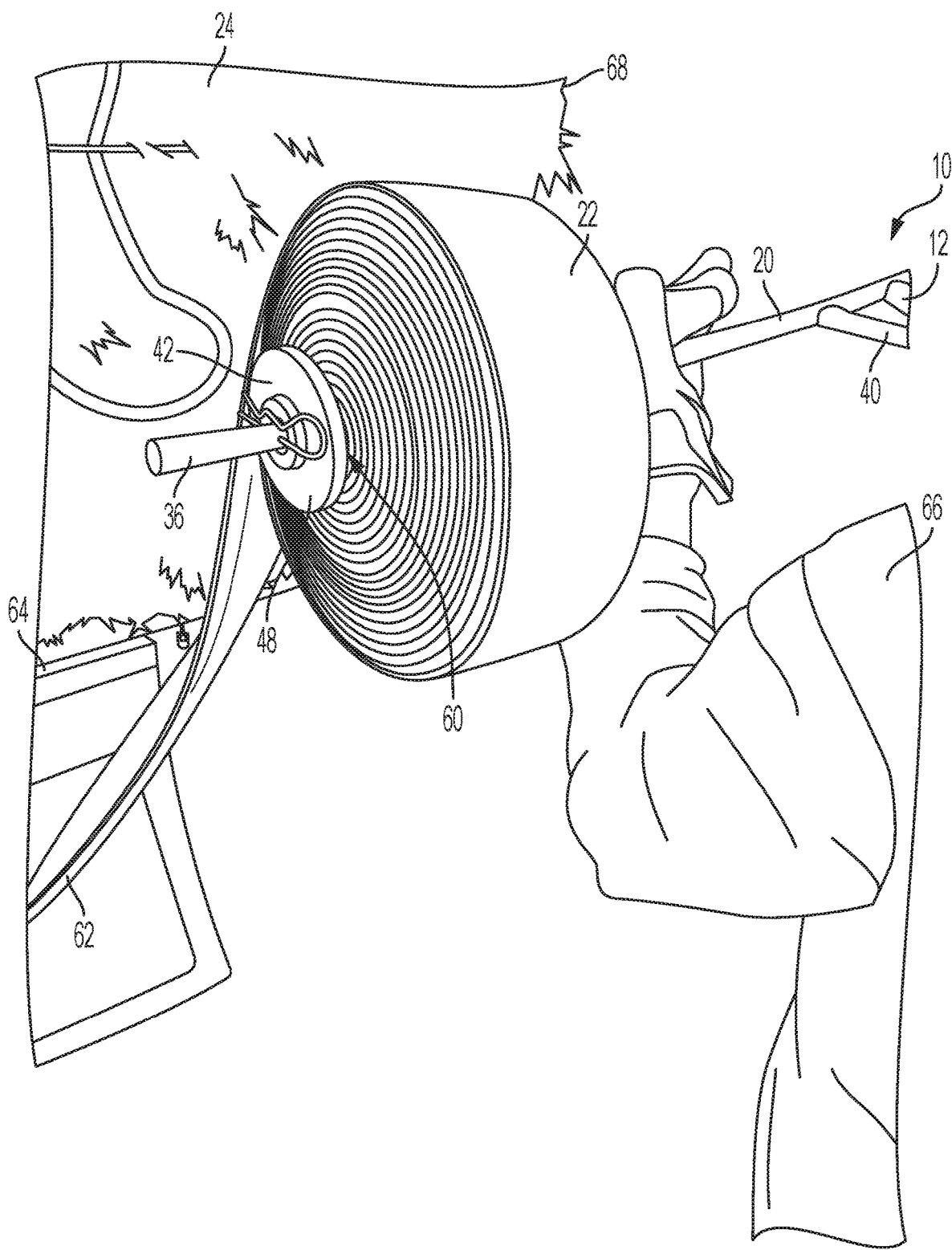
FIG. 3 is a side perspective view of the strapping device of FIG. 1 being used to attach an item to a platform.
Figure 4:
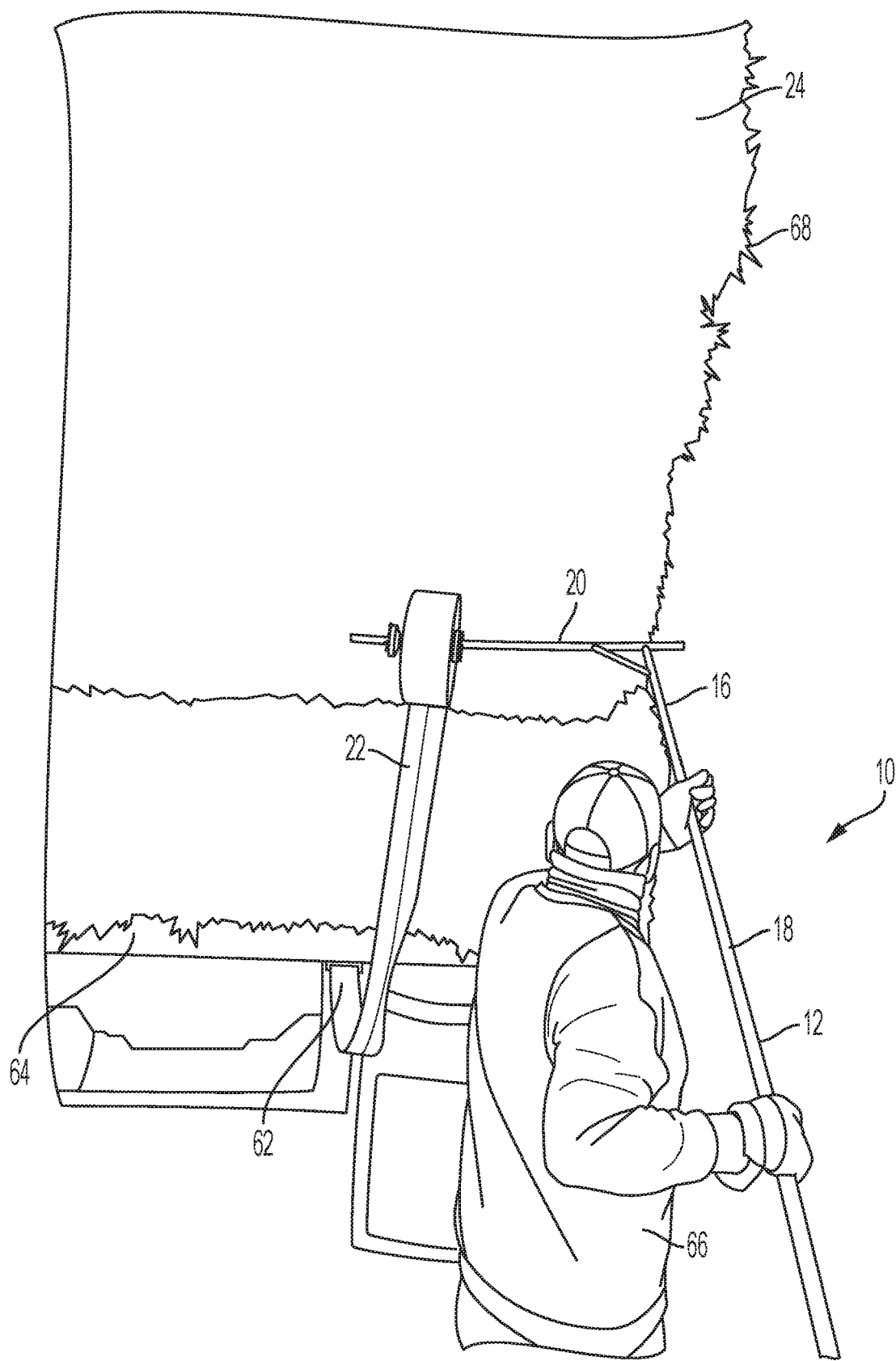
FIG. 4 is a front perspective view of the strapping device of FIG. 1 being used to attach an item to a platform.

In use, as seen in FIGS. 3 and 4, the free end 62 of the strap 22 can be securely attached to the platform 64, such as the trailer. A user 66 can then use the elongate rod 12 to lift the rest of the strap 22 over and around the item 24 to be secured, such as the bale. As the strap 22 is lifted, the strap 22 can unwind off of the strap arm 20 and onto the bale 24. The predetermined strap arm length can allow the user 66 to walk along the side of the trailer 64 while positioning the strap 22 over the bale 24 at a distance spaced from the edge 68 of the bale 24. After the strap 22 has been positioned over and around the item 24 to be secured, a second end of the strap 22 can be securely attached to the platform 64 to at least partially secure the item 24. This process can be repeated as many times as necessary, placing additional straps 22 over the item 24, until the item 24 has been secured to the platform 64.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A strapping device to secure an item, the strapping device comprising:
   an elongate rod extending along a longitudinal rod axis, the rod having a proximal end, an opposed distal end and a central portion extending between the proximal end and the distal end;
   a handle coupled to the proximal end of the elongate rod, wherein at least a portion of the handle is positioned at an acute angle relative to the longitudinal rod axis, wherein at least a portion of the handle is positioned substantially normal to the longitudinal rod axis, wherein at least a portion of the handle is substantially linear in shape and wherein at least a portion of the handle is arcuate in shape;
   a strap arm coupled to the distal end of the elongate rod, wherein the strap arm comprises a first end coupled to the distal end of the elongate rod and a second end extending away from the elongate rod a predetermined strap arm length, wherein the strap arm is positioned substantially normal to the longitudinal rod axis, wherein the predetermined strap arm length is selected and configured to allow the strap to be positioned over the item at a distance spaced from an edge of the item;
   an intermediate handle coupled to the central portion of the elongate rod, wherein the intermediate handle is positioned substantially normal to the longitudinal rod axis;
   a wound strap positioned around at least a portion of the strap arm; and
   at least one retainer positioned on the strap arm at a desired position relative to the elongate rod and configured to guide the strap.

2. The strapping device of claim 1, wherein the at least one retainer comprises a retainer diameter and defines a retainer bore having a retainer bore diameter greater than a diameter of the strap arm.

3. The strapping device of claim 1, wherein the at least one retainer comprises a first retainer positioned on the strap arm between the strap and the elongate rod, and a second retainer positioned on the strap arm between the strap and the second end of the strap arm.

4. The strapping device of claim 2, wherein the at least one retainer has a first face configured to face the strap and a second face opposed to the first face, and wherein at least a portion of the at least one retainer is substantially frusto-conical in shape.

5. The strapping device of claim 2, wherein a thickness of the at least one retainer is greater adjacent to the retainer bore than the thickness of the at least one retainer adjacent to an outer edge of the retainer.

6. A method of strapping an item to be secured to a platform, the method comprising:
   providing a strapping device comprising:
      a strap;
      an elongate rod extending along a longitudinal rod axis, the rod having a proximal end, an opposed distal end and a central portion extending between the proximal end and the distal end;
      a handle coupled to the proximal end of the elongate rod, wherein at least a portion of the handle is positioned at an acute angle relative to the longitudinal rod axis, and wherein at least a portion of the handle is positioned substantially normal to the longitudinal rod axis;
      an intermediate handle coupled to the central portion of the elongate rod, wherein the intermediate handle is positioned substantially normal to the longitudinal rod axis;
      a strap arm comprising a first end coupled to the distal end of the elongate rod and a second end extending away from the elongate rod a predetermined strap arm length; and
      at least one retainer positioned on the strap arm at a desired position relative to the elongate rod and configured to guide the strap;
   winding the strap around at least a portion of the strap arm such that a first end of the strap is positioned adjacent the strap arm and a free end of the strap extends away from the strap arm;
   attaching the free end of the strap to the platform; and
   lifting the strap arm over and around the item to be secured with the elongate rod such that the strap unwinds off of the strap arm and onto the item, wherein the predetermined strap arm length is configured to position the strap over the item at a distance spaced from an edge of the item.

7. The method of claim 6, wherein the at least one retainer comprises a first retainer positioned on the strap arm between the strap and the elongate rod, and a second retainer positioned on the strap arm between the strap and the second end of the strap arm.

8. The method of claim 6, wherein the at least one retainer has a first face configured to face the strap and a second face opposed to the first face, and wherein at least a portion of the at least one retainer is substantially frustoconical in shape.

9. The method of claim 6, wherein the step of winding the strap around at least a portion of the strap arm comprises winding the strap around itself prior to being positioned on the strap arm.

10. The method of claim 6, wherein the step of winding the strap around at least a portion of the strap arm comprises positioning the strap on the strap arm prior to being wound.

11. The method of claim 6, wherein a thickness of the at least one retainer is greater adjacent to a retainer bore than the thickness of the at least one retainer adjacent to an outer edge of the retainer.

12. The method of claim 6, wherein at least a portion of the handle is substantially linear in shape and wherein at least a portion of the handle is arcuate in shape.

13. The method of claim 6, wherein the predetermined strap arm length is selected and configured to allow the strap to be positioned over the item at a distance spaced from an edge of the item.

* * * * *